(12) United States Patent
Nagano et al.

(10) Patent No.: US 9,552,415 B2
(45) Date of Patent: Jan. 24, 2017

(54) CATEGORY CLASSIFICATION PROCESSING DEVICE AND METHOD

(75) Inventors: Reiko Nagano, Minato (JP); Hajime Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1022 days.

(21) Appl. No.: 13/365,904

(22) Filed: Feb. 3, 2012

(65) Prior Publication Data

US 2012/0239657 A1 Sep. 20, 2012

(30) Foreign Application Priority Data

Mar. 18, 2011 (JP) ................. 2011-061733

(51) Int. Cl.
*G06F 7/00* (2006.01)
*G06F 17/30* (2006.01)

(52) U.S. Cl.
CPC ............... *G06F 17/30707* (2013.01)

(58) Field of Classification Search
CPC ........... G06F 17/30979; G06F 17/30657; G06F 17/30864; G06F 17/30873; G06F 9/4446; G06F 17/30634; G09B 7/00; G09B 7/02
USPC .......... 707/727–731, 750, 708, 771
See application file for complete search history.

(56) References Cited

U.S. PATENT DOCUMENTS

| | | | | |
|---|---|---|---|---|
| 5,519,608 A | * | 5/1996 | Kupiec | G06F 17/3064 704/9 |
| 6,665,640 B1 | * | 12/2003 | Bennett et al. | 704/257 |
| 6,983,227 B1 | * | 1/2006 | Thalhammer-Reyero | G05B 17/02 345/419 |
| 2002/0023144 A1 | * | 2/2002 | Linyard | G06F 9/4446 709/218 |
| 2003/0101153 A1 | * | 5/2003 | Francis et al. | 706/47 |
| 2004/0030556 A1 | * | 2/2004 | Bennett | 704/270 |
| 2004/0117189 A1 | * | 6/2004 | Bennett | 704/270.1 |
| 2004/0122735 A1 | * | 6/2004 | Meshkin | G06Q 30/02 705/14.27 |
| 2004/0254917 A1 | * | 12/2004 | Brill | G06F 17/30654 |
| 2006/0168059 A1 | * | 7/2006 | Chang et al. | 709/206 |
| 2008/0222144 A1 | * | 9/2008 | Backer et al. | 707/5 |
| 2008/0294637 A1 | * | 11/2008 | Liu | 707/6 |
| 2009/0222436 A1 | * | 9/2009 | Nastacio | G06F 17/30675 |
| 2010/0030769 A1 | * | 2/2010 | Cao et al. | 707/5 |
| 2010/0191686 A1 | * | 7/2010 | Wang et al. | 706/46 |

(Continued)

FOREIGN PATENT DOCUMENTS

| | | |
|---|---|---|
| JP | 2006-524370 A | 10/2006 |
| JP | 2010-009471 A | 1/2010 |
| WO | WO-2004/090776 A | 10/2004 |

*Primary Examiner* — Tony Mahmoudi
*Assistant Examiner* — Linh Black
(74) *Attorney, Agent, or Firm* — Fujitsu Patent Center

(57) ABSTRACT

A category classification processing device includes a search unit that stores, as a search keyword log assembly, Q&A examples, which are actually referred to by a client, together with keywords; and a category extracting unit that obtains keyword storage frequencies expressing a number of times each of the keywords, which are recorded together with the Q&A examples in the search keyword logs, is stored for each of the Q&A examples, extracts, as category candidates of each of the Q&A examples, an m number of top keywords (m being a positive integer) in a descending order of the keyword storage frequency, uses the extracted category candidates as categories, and associates the categories with the Q&A examples.

13 Claims, 20 Drawing Sheets

| CATEGORY CANDIDATE | SUB CATEGORY CANDIDATE | Q&A NUMBER |
|---|---|---|
| DVD | RECORD | 1111-1111 |
| | SAVE | 1111-1111 |
| RECORD | DVD | 1111-1111 |
| TELEVISION | CONNECT | 3333-3333 |
| CONNECT | TELEVISION | 3333-3333 |

151

(56) References Cited

U.S. PATENT DOCUMENTS

2013/0304730 A1* 11/2013 Zhou .............................. 707/723

* cited by examiner

FIG.3

LIST OF SEARCH RESULTS

| COPY | SEARCH |

1. [OS#2] PLEASE TELL ME HOW TO INCREASE THE FREE SPACE IN THE HARD DISK.
   Q&A NUMBER [1111-1234]          UPDATED DATE  JANUARY 31, 2010

2. PLEASE EXPLAIN MY RECOVERY.
   Q&A NUMBER [1234-1111]          UPDATED DATE  FEBRUARY 28, 2010

3. [OS#1] PLEASE TELL ME HOW TO INCREASE THE FREE SPACE IN THE HARD DISK.
   Q&A NUMBER [1234-1234]          UPDATED DATE  MARCH 31, 2010

4. [APPLICATION #2] PLEASE TELL ME HOW TO MOVE A MESSAGE FROM APPLICATION #1.
   Q&A NUMBER [5678-1111]          UPDATED DATE  APRIL 30, 2010

5. [OS#2] CANNOT WRITE INTO DVD-RAM.
   Q&A NUMBER [1111-5678]          UPDATED DATE  MAY 31, 2010

6. PLEASE TELL ME HOW TO WRITE DATA IN CD/DVD.
   Q&A NUMBER [9867-9867]          UPDATED DATE  JUNE 30, 2010

Q&A NUMBER [5678-1111]     UPDATED DATE  APRIL 30, 2010

[APPLICATION #2] PLEASE TELL ME HOW TO MOVE A MESSAGE FROM APPLICATION #1.

| Q | QUESTION |

PLEASE TELL ME HOW TO MOVE A MESSAGE OF APPLICATION #1 OF OS#1 TO APPLICATION #2 OF OS#2.

| A | ANSWER |

EXPORT MESSAGE AT APPLICATION #1, AND IMPORT MESSAGE AT APPLICATION #2.

| IMPORTANT |

WHEN A MAIL ACCOUNT IS NOT SET AT APPLICATION #2, CREATE MAIL ACCOUNT IN ADVANCE BEFORE PERFORMING PROCEDURE.

| REFERENCE_LOG_DATE | ... | REFERENCE_QUERY | ... | REFERENCE_PUBLIC_ID |
|---|---|---|---|---|
| 2011/1/31 21:00 | | COPY | | 5678-1111 |
| 2011/1/31 21:00 | | DVD | | 1111-1111 |
| 2011/1/31 21:00 | | BLUE BACK | | 6904-6294 |
| 2011/1/31 21:00 | | FORMULA CREATE FROM SELECTED RANGE | | 7504-6494 |
| 2011/1/31 21:00 | | CE 70H7 INCREASE MEMORY | | 3704-3356 |
| 2011/1/31 21:00 | | EASY BACKUP | | 4705-6196 |
| 2011/1/31 21:01 | | BLUE BACK | | 1504-6638 |
| 2011/1/31 21:02 | | "DOWNLOAD" | | 7806-3647 |
| 2011/1/31 21:02 | | UPDATE NAVIGATION | | 0305-2574 |
| 2011/1/31 21:02 | | BLUE BACK | | 8007-1071 |
| ... | | | | |

| Q&A NUMBER | SEARCH KEYWORD |
|---|---|
| 1111-1111 | DVD |
| 1111-1111 | "dvd" "RECORD" |
| 1111-1111 | WANT TO RECORD IN DVD |
| 1111-1111 | RECORD |
| 1111-1111 | DVD RECORD Blu-ray |
| 1111-1111 | SAVE DVD |
| 2222-2222 | DVD |
| 3333-3333 | TELEVISION |
| 3333-3333 | DVD |

FIG.6B

| Q&A NUMBER | SEARCH KEYWORD |
|---|---|
| 1111-1111 | RECORD |
| 1111-1111 | dvd SAVE |
| 1111-1111 | "CAPACITY DVD" |
| 1111-1111 | dvd |
| 1111-1111 | DVD-R |
| 2222-2222 | DVD |
| 2222-2222 | DVD |
| 3333-3333 | TELEVISION CONNECT |

| Q&A NUMBER | WORD | WORD | WORD | WORD |
|---|---|---|---|---|
| 1111-1111 | DVD | RECORD | | |
| 1111-1111 | WANT TO RECORD IN DVD | | | |
| 1111-1111 | RECORD | | | |
| 1111-1111 | DVD | RECORD | BLU-RAY | |
| 1111-1111 | SAVE | DVD | | |
| 2222-2222 | DVD | | | |
| 3333-3333 | TELEVISION | | | |
| 3333-3333 | DVD | | | |
| 1111-1111 | RECORD | | | |
| 1111-1111 | DVD | SAVE | | |
| 1111-1111 | CAPACITY | DVD | | |
| 1111-1111 | DVD | | | |
| 1111-1111 | DVD-R | | | |
| 2222-2222 | DVD | | | |
| 2222-2222 | DVD | | | |
| 3333-3333 | TELEVISION | CONNECT | | |

Rows 1–8: SEARCH AND EXTRACT FROM EXAMPLE SEARCH SERVER

Rows 9–16: SEARCH AND EXTRACT FROM EXTERNAL SEARCH SITE

FIG.8

| Q&A NUMBER | SEARCH KEYWORD |
|---|---|
| 1111-1111 | DVD |
| 1111-1111 | DVD |
| 1111-1111 | RECORD |
| 1111-1111 | WANT TO RECORD IN DVD |
| 1111-1111 | RECORD |
| 1111-1111 | DVD |
| 1111-1111 | RECORD |
| 1111-1111 | BLU-RAY |
| 1111-1111 | SAVE |
| 1111-1111 | DVD |
| 2222-2222 | DVD |
| 3333-3333 | TELEVISION |
| 3333-3333 | DVD |
| 1111-1111 | RECORD |
| 1111-1111 | DVD |
| 1111-1111 | SAVE |
| 1111-1111 | CAPACITY |
| 1111-1111 | DVD |
| 1111-1111 | DVD |
| 1111-1111 | DVD-R |
| 2222-2222 | DVD |
| 2222-2222 | DVD |
| 3333-3333 | TELEVISION |
| 3333-3333 | CONNECT |

FIG.9

| Q&A NUMBER | WORD | WORD |
|---|---|---|
| 1111-1111 | DVD | RECORD |
| 1111-1111 | DVD | RECORD |
| 1111-1111 | BLU-RAY | DVD |
| 1111-1111 | BLU-RAY | RECORD |
| 1111-1111 | DVD | SAVE |
| 1111-1111 | DVD | SAVE |
| 1111-1111 | DVD | CAPACITY |
| 3333-3333 | TELEVISION | CONNECT |

| KEY | | REFERENCE FREQUENCY |
|---|---|---|
| Q&A NUMBER | WORD | |
| 1111-1111 | DVD | 7 |
| 1111-1111 | RECORD | 4 |
| 1111-1111 | SAVE | 2 |
| 1111-1111 | WANT TO RECORD IN DVD | 1 |
| 1111-1111 | BLU-RAY | 1 |
| 1111-1111 | CAPACITY | 1 |
| 1111-1111 | DVD-R | 1 |
| 2222-2222 | DVD | 3 |
| 3333-3333 | TELEVISION | 2 |
| 3333-3333 | DVD | 1 |
| 3333-3333 | CONNECT | 1 |

| KEY | | | REFERENCE FREQUENCY |
|---|---|---|---|
| Q&A NUMBER | WORD | WORD | |
| 1111-1111 | DVD | RECORD | 2 |
| 1111-1111 | DVD | SAVE | 2 |
| 1111-1111 | BLU-RAY | DVD | 1 |
| 1111-1111 | BLU-RAY | RECORD | 1 |
| 1111-1111 | DVD | CAPACITY | 1 |
| 3333-3333 | TELEVISION | CONNECT | 1 |

| Q&A NUMBER | CATEGORY CANDIDATE | REFERENCE FREQUENCY |
|---|---|---|
| 1111-1111 | DVD | 7 |
| 1111-1111 | RECORD | 4 |
| 2222-2222 | DVD | 3 |
| 3333-3333 | TELEVISION | 2 |
| 3333-3333 | DVD | 1 |
| 3333-3333 | CONNECT | 1 |

| Q&A NUMBER | TENTATIVE SUB CATEGORY CANDIDATE | |
|---|---|---|
| 1111-1111 | DVD | RECORD |
| 1111-1111 | DVD | SAVE |
| 3333-3333 | TELEVISION | CONNECT |

| CATEGORY CANDIDATE | Q&A NUMBER | REFERENCE FREQUENCY | TOTAL REFERENCE FREQUENCY |
|---|---|---|---|
| DVD | 1111-1111 | 7 | 11 |
| DVD | 2222-2222 | 3 | 11 |
| DVD | 3333-3333 | 1 | 11 |
| RECORD | 1111-1111 | 4 | 4 |
| TELEVISION | 3333-3333 | 2 | 2 |
| CONNECT | 3333-3333 | 1 | 1 |

| CATEGORY CANDIDATE | SUB CATEGORY CANDIDATE | Q&A NUMBER |
|---|---|---|
| DVD | RECORD | 1111-1111 |
| DVD | SAVE | 1111-1111 |
| RECORD | DVD | 1111-1111 |
| TELEVISION | CONNECT | 3333-3333 |
| CONNECT | TELEVISION | 3333-3333 |

| KEY | | REFERENCE FREQUENCY |
|---|---|---|
| Q&A NUMBER | WORD | |
| 1111-1111 | DVD | 4 |
| 1111-1111 | RECORD | 2 |
| 1111-1111 | BLU-RAY | 2 |
| 1111-1111 | WANT TO RECORD IN DVD | 1 |

| KEY | | REFERENCE FREQUENCY |
|---|---|---|
| Q&A NUMBER | WORD | |
| 1111-1111 | DVD | 4 |
| 1111-1111 | RECORD | 2 |
| 1111-1111 | BLU-RAY | 2 |

| KEY | | REFERENCE FREQUENCY |
|---|---|---|
| Q&A NUMBER | WORD | |
| 1111-1111 | DVD | 4 |
| 1111-1111 | RECORD | 4 |
| 1111-1111 | BLU-RAY | 2 |
| 1111-1111 | WANT TO RECORD IN DVD | 1 |

| KEY | | REFERENCE FREQUENCY |
|---|---|---|
| Q&A NUMBER | WORD | |
| 1111-1111 | DVD | 4 |
| 1111-1111 | RECORD | 4 |

FIG.14

| CATEGORY | SUB CATEGORY A | Q&A EXAMPLE |
|---|---|---|
| CATEGORY A | SUB CATEGORY A | Q&A EXAMPLE #1 |
| | | Q&A EXAMPLE #2 |
| | | Q&A EXAMPLE #3 |
| | SUB CATEGORY B | Q&A EXAMPLE #4 |
| | | Q&A EXAMPLE #5 |
| CATEGORY B | SUB CATEGORY A | Q&A EXAMPLE #6 |
| | | Q&A EXAMPLE #7 |
| | | Q&A EXAMPLE #8 |
| ... | ... | ... |

| CATEGORY ID | CATEGORY |
|---|---|
| 1 | DVD |
| 2 | RECORD |
| 3 | TELEVISION |
| 4 | CONNECT |

FIG.15B

| SUB CATEGORY ID | CATEGORY ID | SUB CATEGORY |
|---|---|---|
| 1 | 1 | RECORD |
| 2 | 1 | SAVE |
| 3 | 2 | DVD |
| 4 | 3 | CONNECT |
| 5 | 4 | TELEVISION |

FIG.15C

| CATEGORY ID | SUB CATEGORY ID | Q&A NUMBER |
|---|---|---|
| 1 | | 1111-1111 |
| 1 | | 2222-2222 |
| 1 | | 3333-3333 |
| 1 | 1 | 1111-1111 |
| 1 | 2 | 1111-1111 |
| 2 | | 1111-1111 |
| 2 | 3 | 1111-1111 |
| 3 | | 3333-3333 |
| 3 | 4 | 3333-3333 |
| 4 | | 3333-3333 |
| 4 | 5 | 3333-3333 |

173

CATEGORY CLASSIFICATION PROCESSING DEVICE AND METHOD

CROSS-REFERENCE TO RELATED APPLICATION

This patent application is based upon and claims the benefit of priority of the prior Japanese Patent Application No. 2011-061733 filed on Mar. 18, 2011, the entire contents of which are incorporated herein by reference.

FIELD

The embodiments discussed herein are related to a category classification processing device, a category classification processing method, and a recording medium storing a category classification processing program.

BACKGROUND

Many companies have a Q&A database accumulating examples of questions and answers (hereinafter, Q&A) regarding their own products, so that users can access the Q&A database via the Internet. A Q&A database is to be constructed so that users can obtain satisfactory answers. That is to say, when a user inputs a question of a certain category, a satisfactory answer for the user is to be extracted in response to the question. Thus, Q&A examples including pairs of questions and answers are preferably classified into appropriate categories.

There is proposed a question and answer search system including an example database and a refined keyword selection unit. The example database stores examples of pairs of questions and answers. The refined keyword selection unit calculates the importance of keywords included in an example question based on the similarity between answers that are paired with the question, and selects a refined keyword from among the keywords for identifying the answer to the question according to the calculated importance.

Furthermore, there is proposed an expert selection method including the steps of receiving a question from a first user; determining the category related to the question; providing the question onto a predetermined web page; receiving an answer to the question from a second user; increasing the number of answers that are related to the second user and that correspond to the category in response to the answer being input; increasing the number of answer adoptions that are related to the second user and that correspond to the category if the answer is selected by the first user; computing a point related to the second user that corresponds to the category on the basis of an evaluation material including the number of answers and the number of answer adoptions; and selecting the second user, who meets a predetermined condition based on the point, as an expert of a relevant field in the category.

Patent document 1: Japanese Laid-Open Patent Publication No. 2010-009471

Japanese National Publication of International Patent Application No. 2006-524370

Examples of Q&A are manually classified into appropriate categories by the operator of the Q&A database. To actually classify the examples, either one of the following methods may be performed. One method involves actually reading the questions and answers and classifying them. Another method involves extracting keywords from character strings in the body text of questions and the body text of answers, and classifying the examples based on the extracted keywords.

However, it takes a significant amount of time and effort for the operator to classify the Q&A examples. Thus, the operation of updating the categories into which the examples have already been classified is virtually difficult, or this operation can only be executed after a significant amount of time has elapsed. Consequently, the Q&A examples belonging to the categories become outdated. Furthermore, the categories themselves may become obsolete. If the categories become obsolete, new Q&A examples cannot be classified into any of the existing categories. Furthermore, the relationship between the categories and the Q&A examples, i.e., the appropriateness of category classification, may not be congruous with the user's assumptions.

SUMMARY

According to an aspect of the present invention, a category classification processing device includes an example storage unit configured to store Q&A (questions and answers) examples including pairs of questions and answers; a log storage unit configured to store search keyword logs relevant to searching the Q&A examples; a search unit configured to send, to a terminal device, an input screen image used for inputting one or more keywords, search the example storage unit by using the one or more keywords input to the input screen image and extract Q&A examples based on the one or more keywords, send identification information items expressing the extracted Q&A examples to the terminal device, and store, in the log storage unit, search keyword logs including the identification information items relevant to the Q&A examples which are actually referred to at the terminal device with the use of the identification information items, the identification information items in the search keyword logs being associated with the one or more keywords input to the input screen image; and a category extraction unit configured to obtain keyword storage frequencies expressing a number of times each of the keywords, which are recorded together with the Q&A examples in the search keyword logs, is stored for each of the Q&A examples, extract, as category candidates of each of the Q&A examples, an m number of top keywords (m being a positive integer) in a descending order of the keyword storage frequency, use the extracted category candidates as categories, and associate the categories with the Q&A examples.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3 illustrates a category classification process;

FIG. 4 illustrates a category classification process;

FIG. 5 illustrates a category classification process;

FIGS. 6A and 6B illustrate a category classification process;

FIG. 7 illustrates a category classification process;

FIG. 8 illustrates a category classification process;

FIG. 9 illustrates a category classification process;

FIGS. 10A and 10B illustrate a category classification process;

FIGS. 11A through 11D illustrate a category classification process;

FIGS. 12A and 12B illustrate a category classification process;

FIGS. 13A and 13B illustrate a category classification process;

FIG. 14 illustrates a category classification process;

FIGS. 15A through 15C illustrate a category classification process;

DESCRIPTION OF EMBODIMENTS

Preferred embodiments of the present invention will be explained with reference to accompanying drawings.

Figure 1:
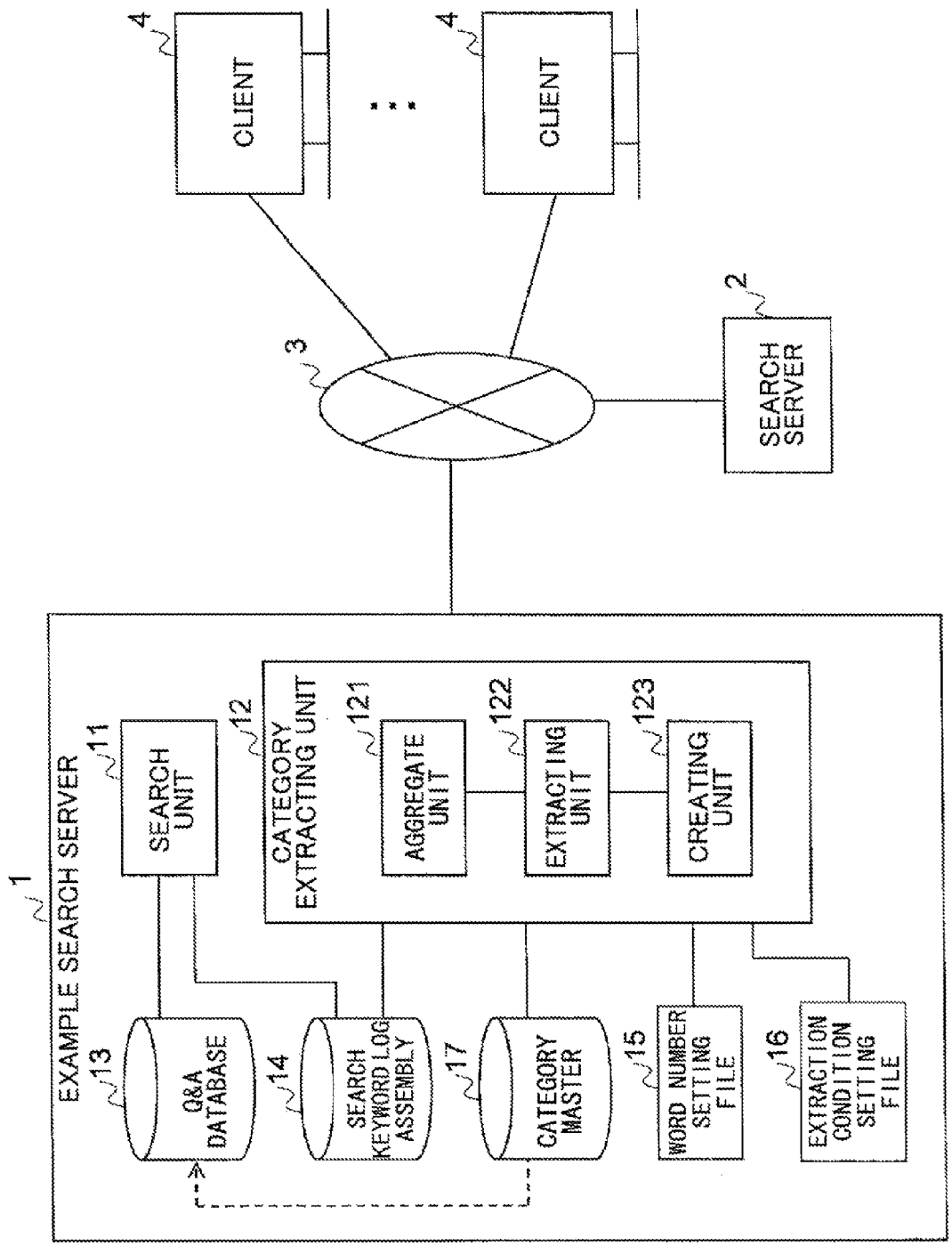
FIG. 1 illustrates an example of a question and answer system including a category classification processing device.

FIG. 1 illustrates an example of a question and answer system including a category classification processing device.

The question and answer system includes an example search server 1, a search server 2, a network 3, and plural clients 4. The example search server 1, the search server 2, and the clients 4 are interconnected by the network 3 such as the Internet.

The client 4 is a terminal device that accesses the example search server 1 via the network 3, searches for examples stored in the example search server 1, and acquires search results. For example, the examples stored in the example search server 1 are examples of questions and answers (hereinafter, Q&A).

Furthermore, the client 4 accesses the search server 2 via the network 3, accesses the example search server 1 via the search server 2, and searches the examples stored in the example search server 1 to acquire a search result. The search server 2 may store the same examples as those stored by the example search server 1, and the client 4 may search the examples stored in the search server 2. The examples stored in the search server 2 are, for example, Q&A examples.

The example search server 1 includes a search unit 11, a category extracting unit 12, a Q&A database 13, a search keyword log assembly 14, a word number setting file 15, an extraction condition setting file 16, and a category master 17. The category extracting unit 12 includes an aggregate unit 121, an extracting unit 122, and a creating unit 123.

The search unit 11 sends an input screen image used for inputting one or more keywords to the client 4, in response to a request from the client 4.

A user of the client 4 that has viewed the displayed screen image inputs a keyword in the input screen image. When a keyword is input in the input screen image, the client 4 sends the input keyword to the example search server 1.

When the input keyword is received, the example search server 1 sends the received keyword to the search unit 11. In response to receiving the keyword, the search unit 11 searches the Q&A database 13 according to the received keyword, i.e., one or more keywords input to the input screen image, and extracts examples of Q&A associated with the keyword. At this time, plural Q&A examples are extracted.

The search unit 11 sends identification information expressing the extracted Q&A examples to the client 4. The identification information is for uniquely identifying the Q&A examples. The identification information may be, for example, a Q&A number. As described above, plural Q&A examples are extracted, and therefore, the search unit 11 generates, for example, a list of plural identification information items corresponding to the plural Q&A examples, and sends the generated list to the client 4. The client 4 displays the received list of plural identification information items on a display device.

The user of the client 4 that has viewed the displayed list of plural identification information items selects one identification information item from the list of plural identification information items. When one identification information item is selected from the list of plural identification information items, the client 4 sends the selected one identification information item to the example search server 1.

When the selected one identification information item is received, the example search server 1 sends the received one identification information item to the search unit 11. In response to receiving the one identification information item, the search unit 11 reads one Q&A example expressed by the one identification information item selected from the Q&A database 13, and sends the Q&A example to the client 4. The client 4 displays the received one Q&A example on the display device. Accordingly, the user of the client 4 views the displayed Q&A example and recognizes the answer that the user has desired. Thus, the one Q&A example expressed by the selected one identification information item is the Q&A example that is actually referred to by the user of the client 4 with the use of identification information.

The search unit 11 stores, in a search keyword log storage unit, the identification information of the Q&A example actually referred to by the user of the client 4 with the use of identification information. At this time, the search unit 11 stores the identification information of the Q&A example together with one or more keywords input to the input screen image. Accordingly, one search keyword log is created, which is a log relevant to searching the Q&A database 13. Thus, one search keyword log includes the identification information of the Q&A example and one or more keywords.

Every time the Q&A database 13 is searched, one search keyword log is created. Therefore, in the search keyword log storage unit, the search keyword log assembly 14 is created, which is an assembly of multiple search keyword logs.

The category extracting unit 12 extracts the category into which the Q&A example is to be classified, based on the search keyword log assembly 14.

Specifically, in the category extracting unit 12, the aggregate unit 121 calculates the number of times each keyword recorded together with a Q&A example has been stored in the search keyword log assembly 14. That is to say, for each Q&A example, the number of times each keyword has been referred to is calculated.

In the category extracting unit 12, the extracting unit 122 extracts, for each Q&A example, the top m keywords (m being a positive integer) with the highest frequencies (i.e., referred to most frequently) as category candidates for each Q&A example. Therefore, an m number of category candidates are extracted. The value of m is written into the extraction condition setting file 16 in advance. Thus, the m value can be easily changed. The extraction condition setting file 16 is stored in an extraction condition setting file storing unit. The m value is, for example, two. Accordingly, the number of extracted category candidates can be reduced.

In the category extracting unit 12, the creating unit 123 uses the extracted category candidates as categories, and associates the categories with Q&A examples. That is to say, the Q&A examples are classified into categories. The creating unit 123 stores the relationship between the category and Q&A example associated to each other in the category master 17. The category master 17 is a file for storing the relationships between categories and Q&A examples associated to each other, and is stored in a category master storage unit. The category master 17 is applied to the data structure of the Q&A database 13.

The category extracting unit 12 extracts sub categories into which the Q&A examples are to be classified, based on the search keyword log assembly 14.

Specifically, in the category extracting unit 12, the aggregate unit 121 calculates the number of times a group of keywords (keyword group) has been stored for each Q&A example. A keyword group includes an n number of keywords (n being a positive integer) stored together with a Q&A example. That is to say, for each Q&A example, the number of times each keyword group has been referred to is calculated. The value of n is written into the word number setting file 15 in advance. Thus, the n value can be easily changed. The word number setting file 15 is stored in a word number setting file storage unit. The n value is, for example, two. Accordingly, the number of extracted sub category candidates can be reduced.

In the category extracting unit 12, the extracting unit 122 extracts, for each Q&A example, keywords belonging the top m keyword groups (m being a positive integer) with the highest frequencies as tentative sub category candidates for each Q&A example. Therefore, an m number of tentative sub category candidates are extracted. As described above, the m value can be easily changed. The m value is, for example, two. Accordingly, the number of extracted tentative sub category candidates can be reduced.

In the category extracting unit 12, the creating unit 123 uses the extracted category candidates as categories, uses the extracted tentative sub category candidates as sub categories, associates the categories with sub categories, and associates sub categories with Q&A examples. That is to say, the Q&A examples are classified into sub categories, and the sub categories are classified into categories. The creating unit 123 stores the relationships between the categories and sub categories associated to each other, and the relationships between the sub categories and Q&A examples associated to each other in the category master 17.

Figure 2:
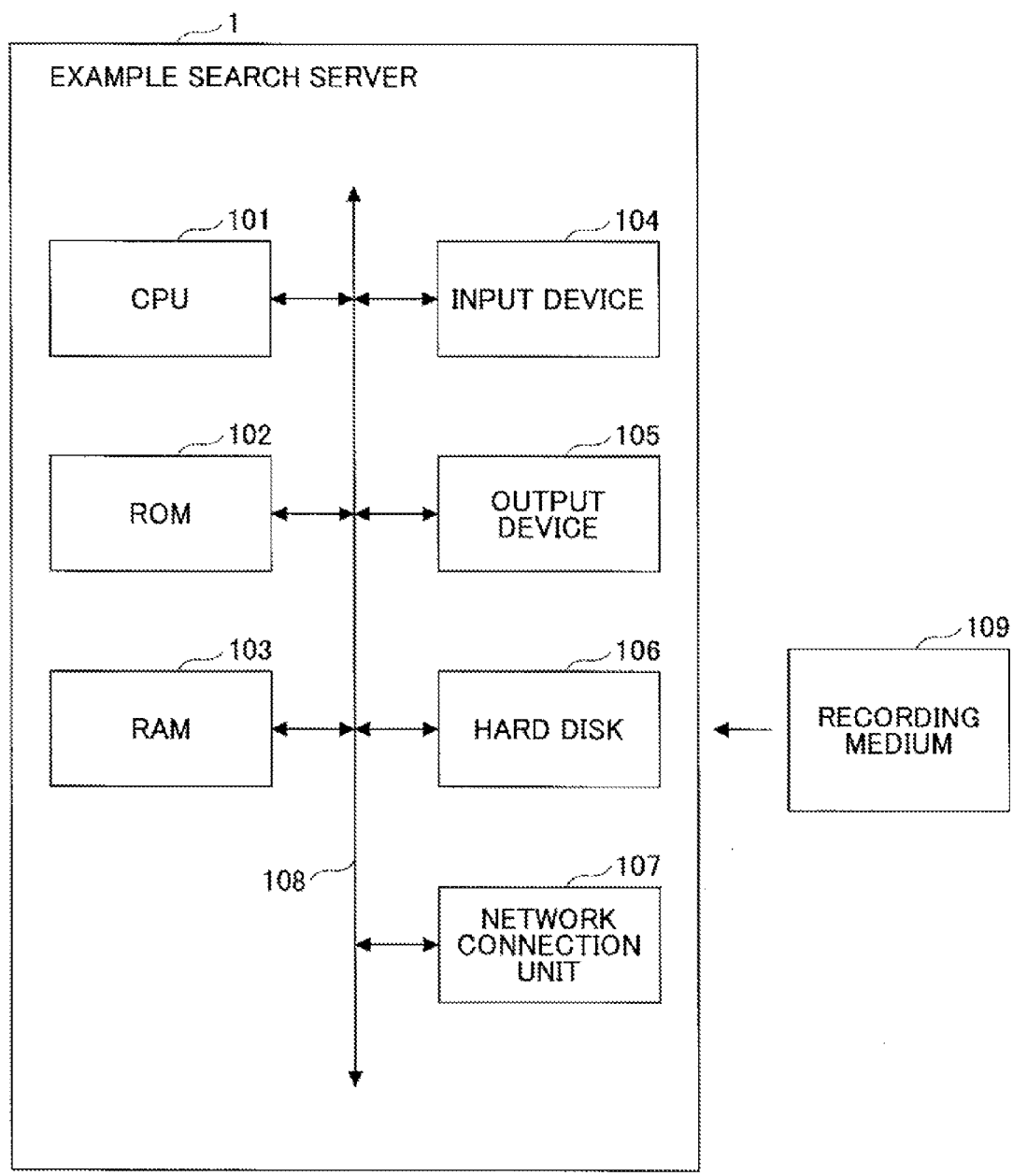
FIG. 2 illustrates a hardware configuration of an example search server.

FIG. 2 illustrates a hardware configuration of the example search server 1.

A CPU 101 controls the example search server 1 according to a control program stored in a ROM 102. The CPU 101 executes a search program and a category extracting program in a RAM 103 that is the main memory. Accordingly, the search unit 11 and the category extracting unit 12 are implemented. The search program and category extracting program are stored in a recording medium 109 such as a CD-ROM and a DVD, input to a hard disk 106 from the recording medium 109, and loaded into the RAM 103 from the hard disk 106.

The Q&A database 13, the search keyword log storage unit, the category master storage unit, the word number setting file storage unit, and the extraction condition setting file storing unit are provided, for example, in the hard disk 106. That is to say, the data is stored in, for example, the hard disk 106. The data is stored in the recording medium 109 such as a CD-ROM and a DVD, input to the hard disk 106 from the recording medium 109, loaded into the RAM 103 from the hard disk 106 according to need, and processed by the search unit 11 or the category extracting unit 12.

An input device 104 is, for example, a keyboard, and may include a mouse. An output device 105 is, for example, a display unit, and may include an output device such as a printer. The CPU 101, the ROM 102, the RAM 103, the input device 104, the output device 105, the hard disk 106, and a network connection unit 107 are interconnected by a bus 108.

The network connection unit 107 is, for example, a transmitting and receiving device, which is connected to the network 3 and connected to other computers such as the search server 2 and plural clients 4 via the network 3. Accordingly, the example search server 1 performs communications with the search server 2 and plural clients 4.

In the following, with reference to FIGS. 3 through 17, a detailed description is given of categories and sub categories of Q&A examples.

As described above, the search unit 11 of the example search server 1 sends an input screen image for inputting keywords to the client 4, in response to a request from the client 4. When the client 4 displays the received input screen image on the display device, the user inputs, for example, a keyword "copy" as indicated in FIG. 3. The input screen image includes, for example, a field in which the keyword "copy" is input and a search button indicated at the top part of a screen image 41 in FIG. 3.

When the client 4 sends the input keyword to the example search server 1, the search unit 11 of the example search server 1 searches the Q&A database 13 by the received keyword "copy", extracts plural Q&A examples with which the keyword "copy" is associated, and sends a list of Q&A numbers expressing the extracted plural Q&A examples to the client 4. The client 4 displays the screen image 41 including the received list of plural Q&A examples on the display device, as illustrated in FIG. 3.

At this time, the screen image 41 actually includes, for each Q&A example, the title of the Q&A example such as "please tell me how to increase the free space in the hard disk [OS#2]", as well as the updated date of the Q&A example, in addition to the Q&A number, as indicated in FIG. 3. Accordingly, the search unit 11 sends, to the client 4, the screen image 41 including the titles of the Q&A numbers and the updated dates of the Q&A numbers, in addition to the list of Q&A numbers. The user of the client 4 who has viewed the displayed screen image 41 selects, for example, the fourth Q&A number "5678-1111". The client 4 sends the selected Q&A number "5678-1111" to the example search server 1.

The search unit 11 reads, from the Q&A database 13, the Q&A example having the selected Q&A number "5678-1111", and sends, to the client 4, a screen image 42 of the Q&A example having the received Q&A number "5678-1111". As indicated in FIG. 4, the client 4 displays the screen image 42 of the Q&A example having the received Q&A number "5678-1111" on the display device. Accordingly, the user of the client 4 recognizes the Q&A example having the received Q&A number "5678-1111".

The Q&A example having the Q&A number "5678-1111" is the Q&A example that is actually referred to by the user of the client 4.

As illustrated in FIG. 5, the search unit 11 adds, to the search keyword log assembly 14, the Q&A number "5678-1111" of the Q&A example that has actually been referred to, and the keyword "copy", as one search keyword log.

At this time, in the search keyword log assembly 14, each search keyword log actually stores the date when the Q&A example is referred to (REFERENCE LOG DATE), the keyword (REFERENCE QUERY), and the Q&A number (REFERENCE PUBLIC ID), as indicated in FIG. 5. In the search keyword log assembly 14, the search keyword logs may include various data items relevant to referring to the Q&A examples.

A search keyword log assembly 14A is an assembly of search keyword logs, in cases where the Q&A database 13 is accessed from the client 4 via the search server 2. That is to say, the search keyword log assembly 14A relevant to accesses from the search server 2, which is an external search site as viewed from the example search server 1, is generated separately from the search keyword log assembly 14 relevant to accesses to the example search server 1 itself. Similar to the search keyword log assembly 14, the search keyword log assembly 14A stores the date when the Q&A example is referred to (REFERENCE LOG DATE), the keyword (REFERENCE QUERY), and the Q&A number (REFERENCE PUBLIC ID). In the search keyword log assembly 14A, the search keyword log may include various data items relevant to referring to the Q&A example.

The search keyword log assembly 14 and the search keyword log assembly 14A may be generated in an integrated manner. Furthermore, the search keyword log assembly 14A may be transferred from the search server 2 via the network 3.

The category extracting unit 12 extracts categories and sub categories based on the search keyword log assembly 14 at predetermined periods, and classifies the Q&A examples into the extracted categories and sub categories. The periods are, for example, every 24 hours. Therefore, for example, based on the search keyword log assembly 14 that has been accumulated in one day, the categories and sub categories are updated, and classification of Q&A examples into the categories and sub categories is updated. That is to say, the category master 17 is updated. Accordingly, the Q&A database 13 can be searched based on the latest category master 17.

The aggregate unit 121 of the category extracting unit 12 calculates how many times each keyword has been referred to for the respective Q&A examples, based on the search keyword log assembly 14.

As illustrated in FIG. 6A, the aggregate unit 121 first generates extraction results 141. The extraction results 141 are relevant to the search keyword logs stored in the search keyword log assembly 14. Specifically, Q&A numbers and keywords associated with the Q&A numbers are extracted from the search keyword log assembly 14. Furthermore, as illustrated in FIG. 6B, the aggregate unit 121 generates extraction results 142. The extraction results 142 are relevant to the search keyword logs stored in the search keyword log assembly 14A. Specifically, Q&A numbers and keywords associated with the Q&A numbers are extracted from the search keyword log assembly 14A.

Next, as illustrated in FIG. 7, the aggregate unit 121 generates normalization results 143 obtained by normalizing the keywords based on the extraction results 141 and the extraction results 142. For example, the keyword ["dvd" "record"] of the Q&A number "1111-1111" in the second row of the extraction results 141 is divided into two keywords "dvd" and "record" by the aggregate unit 121 because there is a space between these words. The same applies to the fifth and sixth lines of the extraction results 141 and the second, third and eighth lines of the extraction results 142. Furthermore, the aggregate unit 121 deletes [" "] from the two words "dvd" and "record" obtained from the second row of the extraction results 141. The same applies to the third row of the extraction results 142. Furthermore, the aggregate unit 121 converts the word [dvd] obtained from the second row of the extraction results 141 into upper-case letters [DVD]. The same applies to the lower-case letters in the fifth row of the extraction results 141 and the lower-case letters in the second and fourth rows of the extraction results 142.

Accordingly, for example, in the normalization results 143, two keywords [DVD] and [record] are obtained for the Q&A number "1111-1111" in the second row of the extraction results 141, and three keywords [DVD], [record], and [BLU-RAY] are obtained for the Q&A number "1111-1111" in the fifth row of the extraction results 141.

Next, as illustrated in FIG. 8, the aggregate unit 121 generates word list data 144 based on the normalization results 143. For example, the aggregate unit 121 extracts the two keywords [DVD] and [record] for the Q&A number "1111-1111" in the second row of the normalization results 143, as separate keywords. Accordingly, based on the keyword [DVD] for the Q&A number "1111-1111" in the second row of the normalization results 143, a keyword [DVD] is extracted into the second row of the word list data 144. Furthermore, based on the keyword [record] for the Q&A number "1111-1111" in the second row of the normalization results 143, a keyword [record] is extracted into the third row of the word list data 144.

Next, as described above, the value of n stored in the word number setting file 15 is "2", and therefore the aggregate unit 121 generates two word list data 145 based on the normalization results 143 as illustrated in FIG. 9.

For example, the aggregate unit 121 extracts, as a group including two keywords, the two keywords [DVD] and [record] for the Q&A number "1111-1111" in the second row of the normalization results 143. Accordingly, based on the two keywords [DVD] and [record] for the Q&A number "1111-1111" in the second row of the normalization results 143, a group including keywords [DVD] and [record] is extracted into the first row of the two word list data 145.

Furthermore, for example, based on the keywords [DVD], [record], and [BLU-RAY] for the Q&A number "1111-1111" in the fifth row of the normalization results 143, a group including keywords [DVD] and [record] is extracted into the first row of the two word list data 145, a group including keywords [BLU-RAY] and [DVD] is extracted into the third row of the two word list data 145, and a group including keywords [BLU-RAY] and [record] is extracted into the fourth row of the two word list data 145. That is to say, when the number of keywords recorded together with the Q&A example exceeds n, the aggregate unit 121 of the category extracting unit 12 extracts an n number of keywords from the number of keywords exceeding n and groups together the extracted keywords to generate plural groups of keywords. Accordingly, the number of sub category candidates described below can be reduced.

Next, as illustrated in FIG. 10A, the aggregate unit 121 generates aggregation results 146 based on the word list data 144. For example, in the word list data 144, the keyword [DVD] appears seven times for the Q&A number "1111-1111". Accordingly, the aggregation results 146 indicate that the keyword [DVD] has been referred to seven times, for the Q&A number "1111-1111".

Next, as illustrated in FIG. 10B, the aggregate unit 121 generates aggregation results 147 based on the two word list data 145. For example, in the two word list data 145, the group including keywords [DVD] and [record] appears two times for the Q&A number "1111-1111". Accordingly, the aggregation results 147 indicate that the group including keywords [DVD] and [record] has been referred to two times, for the Q&A number "1111-1111".

In the category extracting unit 12, the extracting unit 122 generates a category candidate list 148 based on the aggregation results 146, as illustrated in FIG. 11A. At this time, as described above, the value of m stored in the extraction condition setting file 16 is "2", and therefore the extracting unit 122 extracts the top two keywords with the highest frequencies as category candidates, for each Q&A example.

For example, in the aggregation results 146, [DVD] and [record] are the top two keywords with the highest reference frequencies (number of times the keyword is referred to) for the Q&A number "1111-1111". Therefore, in the category candidate list 148, the keyword [DVD] for the Q&A number "1111-1111" is obtained in the first row, and the keyword [record] for the Q&A number "1111-1111" is obtained in the second row. That is to say, the category candidates for the Q&A number "1111-1111" are the keywords [DVD] and [record].

In the category candidate list 148, a reference frequency is attached to each pair of a Q&A number and a category candidate. In another example, the reference frequency may be omitted.

Next, the extracting unit 122 generates a sub category candidate list 149 based on the aggregation results 147 as illustrated in FIG. 11B. At this time, as described above, the value of m stored in the extraction condition setting file 16 is "2", and therefore the extracting unit 122 extracts the top two keyword groups with the highest frequencies as tentative sub category candidates, for each Q&A example.

For example, in the aggregation results 147, the group including keywords [DVD] and [record] and the group including keywords [DVD] and [save] are the top two keyword groups with the highest reference frequencies for the Q&A number "1111-1111". Therefore, in the sub category candidate list 149, the group including keywords [DVD] and [record] for the Q&A number "1111-1111" is obtained in the first row, and the group including keywords [DVD] and [save] for the Q&A number "1111-1111" is obtained in the second row. That is to say, the tentative sub category candidates for the Q&A number "1111-1111" are the group including keywords [DVD] and [record] and the group including keywords [DVD] and [save].

In extracting category candidates and tentative sub category candidates, the extracting unit 122 extracts category candidates in the following manner.

For example, it is assumed that aggregation results 146A as illustrated in FIG. 12A are generated based on the word list data 144. For each Q&A number, the extracting unit 122 sorts the keywords in descending order of frequency. The extracting unit 122 extracts category candidates for each Q&A number. For example, for the Q&A number "1111-1111", the extracting unit 122 extracts the keyword [DVD] that is ranked number one as a category candidate. Furthermore, the extracting unit 122 determines whether there are "2" or more keywords that are ranked number one. [DVD] is the only keyword that is ranked number one, and therefore the number of keywords that are ranked number one is less than "2". Thus, the extracting unit 122 performs, for the keyword ranked number two, the same process as that performed for the keyword ranked number one. Accordingly, all of the keywords ranked number two, i.e., [record] and [BLU-RAY], are extracted as category candidates for the Q&A number "1111-1111". Consequently, as illustrated in FIG. 12B, three category candidates are obtained in a category candidate list 148A.

In another example, only some of (not all of) the keywords ranked number two (e.g., either one of [record] or [BLU-RAY]) may be extracted as category candidates.

Furthermore, for example, it is assumed that aggregation results 146B as illustrated in FIG. 13A are generated based on the word list data 144. In this case, for the Q&A number "1111-1111", the extracting unit 122 extracts the keywords [DVD] and [record] that are ranked number one as a category candidates. Furthermore, as "2" or more keywords are ranked number one, the extracting unit 122 does not process the keywords that are ranked number two or below. Consequently, as illustrated in FIG. 13B, two category candidates are obtained in a category candidate list 148B.

As described above, the extracting unit 122 sorts the m number of keywords in descending order, and extracts all of or some of the keywords belonging to the obtained rank as category candidates. The extracting unit 122 determines, for each Q&A number, whether the number of keywords belonging to the top rank is greater than or equal to m. When the number is m or more, the extracting unit 122 extracts all of or some of the keywords belonging to the top rank as category candidates. When the number is less than m, the extracting unit 122 determines whether the number of keywords belonging to the next rank to the top rank is greater than or equal to m.

When the total number of keywords recorded together with a certain Q&A number is less than m, the extracting unit 122 extracts all of the keywords recorded together with the Q&A number as category candidates.

Next, the extracting unit 122 merges the Q&A numbers based on the category candidate list 148, using the category candidates in the category candidate list 148 as keys. For example, by using the keyword [DVD] as a key, the Q&A numbers corresponding to [DVD] are bundled together. Accordingly, as illustrated in FIG. 11C, the extracting unit 122 generates a category candidate merge table 150. In the category candidate merge table 150, for example, there are three Q&A numbers having the keyword [DVD] as a category candidate.

In the category candidate merge table 150, a reference frequency is attached to each pair of a Q&A number and a category candidate, and the total reference frequency is attached to each category candidate. The total reference frequency is the sum of reference frequencies for the category candidate. In another example, the reference frequency and total reference frequency may be omitted.

Next, the extracting unit 122 generates a sub category candidate merge table 151 based on the sub category candidate list 149 as illustrated in FIG. 11D. For example, in the sub category candidate list 149, the extracting unit 122 extracts, as a first word, the keyword [DVD] that matches the category candidate [DVD], from among the tentative sub category candidates [DVD] and [record]. Furthermore, the extracting unit 122 extracts, as a second word, the remaining keyword [record] (other than the first word [DVD]), from among the tentative sub category candidates [DVD] and [record].

The number of second words is not limited to one; there may be plural second words. When there are plural second words, each of the second words corresponds to a sub category.

Furthermore, in the sub category candidate list 149, the extracting unit 122 extracts, as a first word, the keyword [record] that matches the category candidate [record], from among the tentative sub category candidates [DVD] and [record]. Furthermore, the extracting unit 122 extracts the remaining keyword [DVD] as a second word. Furthermore, when a category candidate [record] matching the first word is set as a category candidate, the extracting unit 122 sets the second word [DVD] as the sub category candidate of the category candidate.

Consequently, in the sub category candidate merge table 151, for example, there are two sub category candidates "record" and "save" whose category candidate is the keyword [DVD]. Furthermore, for example, the Q&A number "1111-1111" has a sub category candidate of the keyword [record]. That is to say, the Q&A number "1111-1111" belongs to the sub category candidate [record] of the category candidate [DVD].

In the category extracting unit 12, the creating unit 123 generates the category master 17 as illustrated in FIG. 14, based on the category candidate merge table 150 and the sub category candidate merge table 151. For example, the creating unit 123 sets category candidates as categories based on the category candidate merge table 150, sets sub category candidates as sub categories based on the sub category candidate merge table 151, and associates sub categories with categories and associates Q&A numbers with sub categories based on the sub category candidate merge table 151. Accordingly, the category master 17 illustrated in FIG. 14 is generated. In the category master 17 illustrated in FIG. 14, the categories are associated with Q&A numbers via the sub categories.

The category master 17 is not limited to the configuration illustrated in FIG. 14, and may have various configurations. For example, the category master 17 may include plural tables 171 through 173 as illustrated in FIGS. 15A through 15C.

In this case, for example, the creating unit 123 assigns category IDs to the extracted category candidates, and sets the category candidates as categories. The category IDs are assigned to the category candidates in descending order of total reference frequency in the category candidate merge table 150. Accordingly, the first table 171 is generated. That is to say, categories and category IDs are associated with each other.

Furthermore, the creating unit 123 assigns sub category IDs to the extracted sub category candidates, and sets the sub category candidates as sub categories. The sub category IDs are assigned to the sub category candidates in descending order in terms of the frequency of appearing in the sub category candidate merge table 151. Furthermore, the creating unit 123 extracts categories corresponding to the sub categories from the sub category candidate merge table 151, and replaces them with category IDs. Accordingly, the second table 172 is generated. That is to say, categories and sub categories are associated with each other.

Furthermore, the creating unit 123 merges the first table 171 with the second table 172, associates categories with Q&A numbers, and associates categories and sub categories with Q&A numbers. Accordingly, the third table 173 is generated.

For example, for the category ID "1" in the first table 171, the creating unit 123 refers to the category candidate merge table 150 and obtains the corresponding three Q&A numbers. Accordingly, the first through third rows of the third table 173 are obtained. Next, for the category ID "1" in the first table 171, the creating unit 123 refers to the second table 172, and obtains the corresponding one sub category ID "1". Then, the creating unit 123 uses the keyword [DVD] corresponding to the category ID "1" and the keyword [record] corresponding to the sub category ID "1", and refers to the sub category candidate merge table 151 to obtain the corresponding Q&A number "1111-1111". The keyword [DVD] corresponding to the category ID "1" is obtained from the first table 171, and the keyword [record] corresponding to the sub category ID "1" is obtained from the second table 172. The above process is repeated in the order of category IDs and in the order of sub category IDs.

Figure 16:
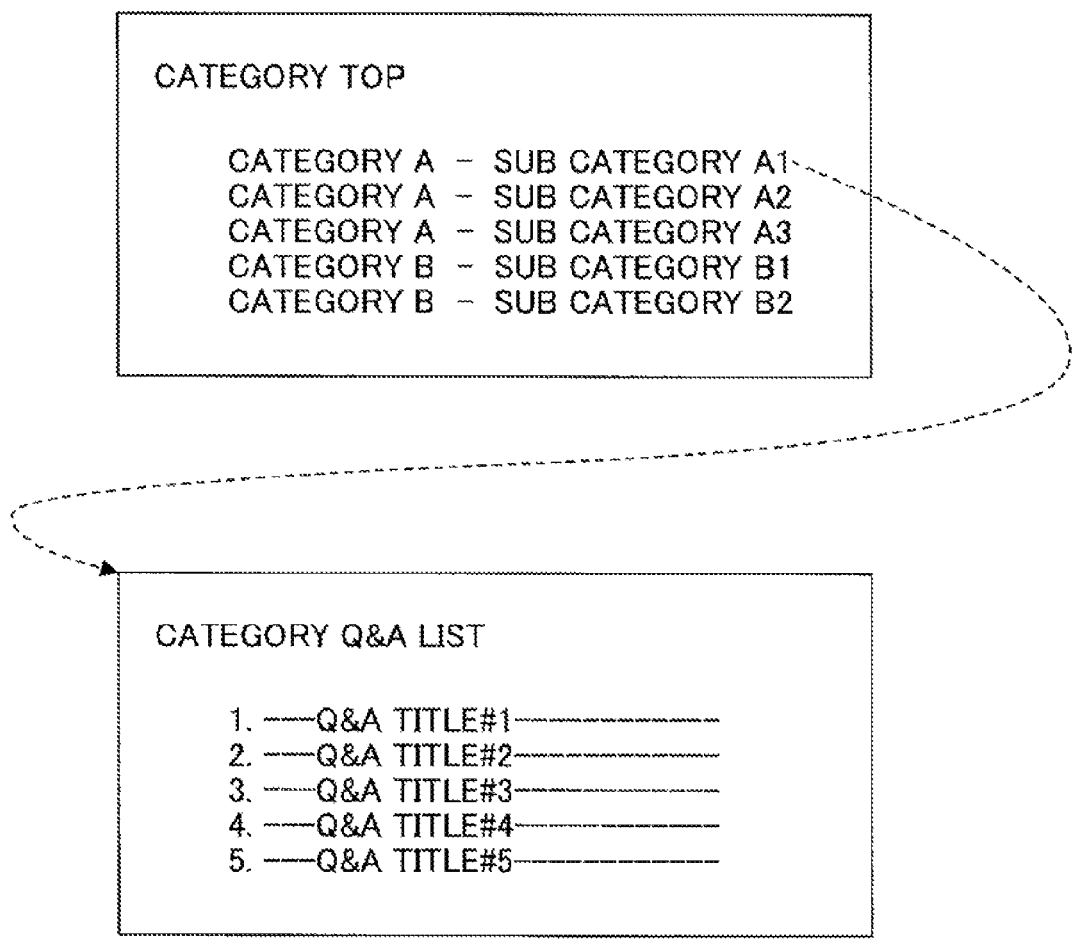
FIG. 16 illustrates a category classification process.

As described above, the category master 17 is applied to the configuration of the Q&A database 13. That is to say, as illustrated in FIG. 16, the configuration of the Q&A database 13 is a hierarchical configuration complying with the category master 17. For example, in the category top, a sub category A1 is associated with a category A, and a category Q&A list is associated with the sub category A1. In the category Q&A list, Q&As belonging to the sub category A1 are associated with the sub category A1.

Based on the Q&A database 13 having a hierarchical configuration complying with the category master 17, the search unit 11 sends the screen image illustrated in FIG. 16 to the client 4, in response to a request from the client 4. In the screen image of FIG. 16, for example, the category top is displayed. It is possible to display only the categories first, and then when a category is selected, the sub category belonging to the selected category may be displayed.

For example, when the user of the client 4 who has viewed the screen image of FIG. 16 clicks a category or a sub category, the search unit 11 uses the clicked category or sub category to search the Q&A database 13. When the search unit 11 extracts, as a search result, the Q&A associated with the category or the sub category, the search unit 11 sends a category Q&A list which is a list of extracted Q&As to the client 4. Accordingly, the client 4 can display the screen image 41 illustrated in FIG. 3.

When the user of the client 4 that has viewed the screen image 41 clicks the title of the Q&A, the search unit 11 uses the title of the Q&A that has been clicked to search the Q&A database 13. Then, the search unit 11 extracts the corresponding Q&A, and sends the extracted Q&A to the client 4. Accordingly, the client 4 can display the screen image 42 illustrated in FIG. 4. At this time, the search unit 11 extracts, as the search keyword log, the Q&A number of the Q&A example that is actually referred to together with the category and sub category clicked first, so that the search keyword log assembly 14 is updated.

Figure 17:
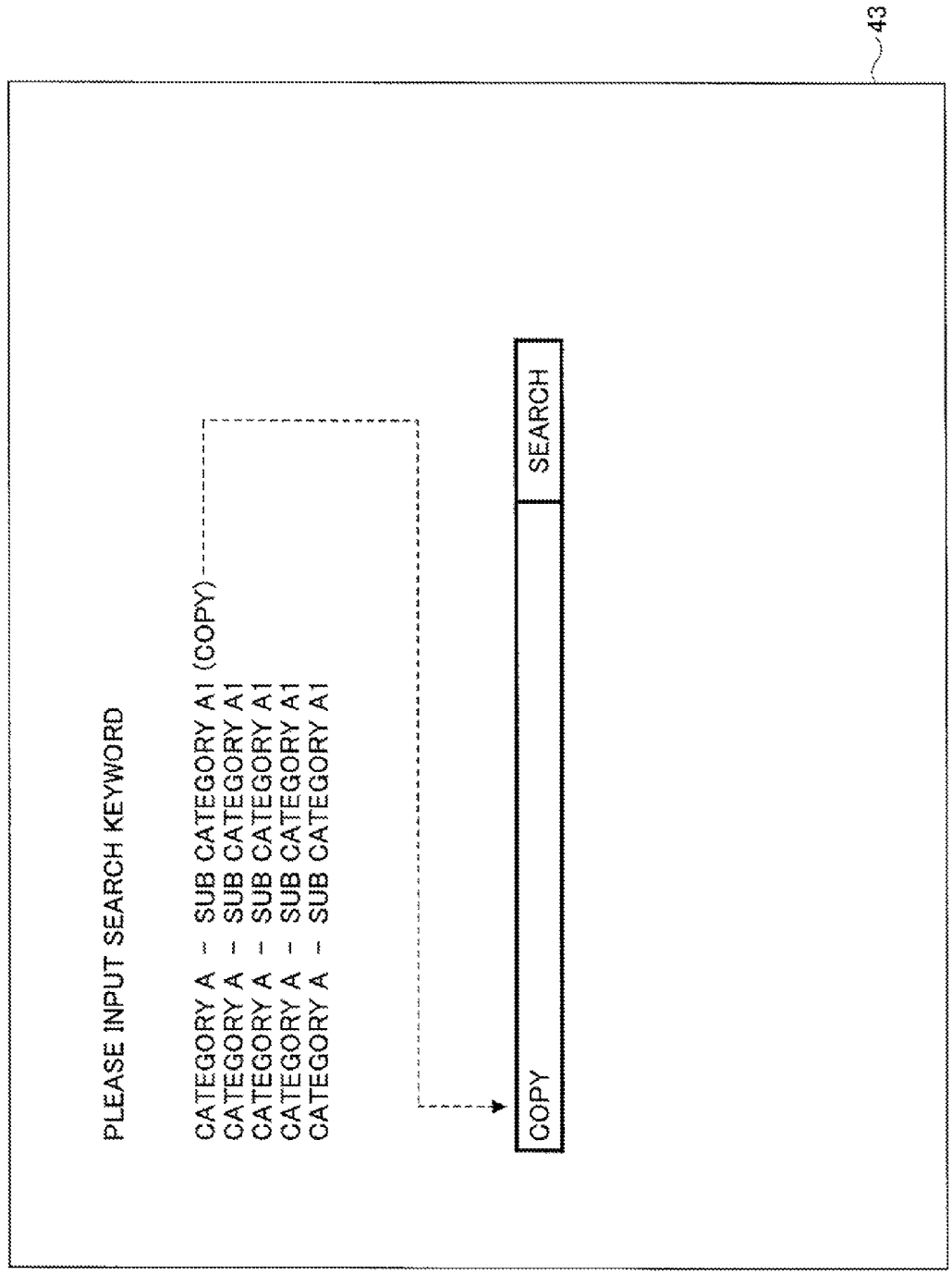
FIG. 17 illustrates a category classification process.

Based on the Q&A database 13 having a hierarchical configuration complying with the category master 17, the search unit 11 may send an input screen image 43 for inputting one or more keywords illustrated in FIG. 17 to the client 4, in response to a request from the client 4. In this case, in the input screen image 43, for example, the category top is displayed. It is possible to display only the categories first, and then when a category is selected, the sub category belonging to the selected category may be displayed.

For example, when the user of the client 4 who has viewed the input screen image 43 clicks a category, the clicked category is input to the input field. When the user clicks a sub category, the clicked sub category is input to the input field. The user may directly input a keyword in the input field. For example, when the sub category A1 is "copy", the user inputs "copy" in the input field, and "copy" is used as the keyword for the search.

The search unit 11 uses one or more keywords input to the input screen image 43 and searches the Q&A database 13, including categories and sub categories which are associated with Q&A numbers by the category extracting unit 12. The search unit 11 extracts, as a search result, a Q&A number associated to a category or a sub category, and sends the extracted Q&A number to the client 4. Accordingly, the client 4 can display the screen image 41 illustrated in FIG. 3.

Figure 18:
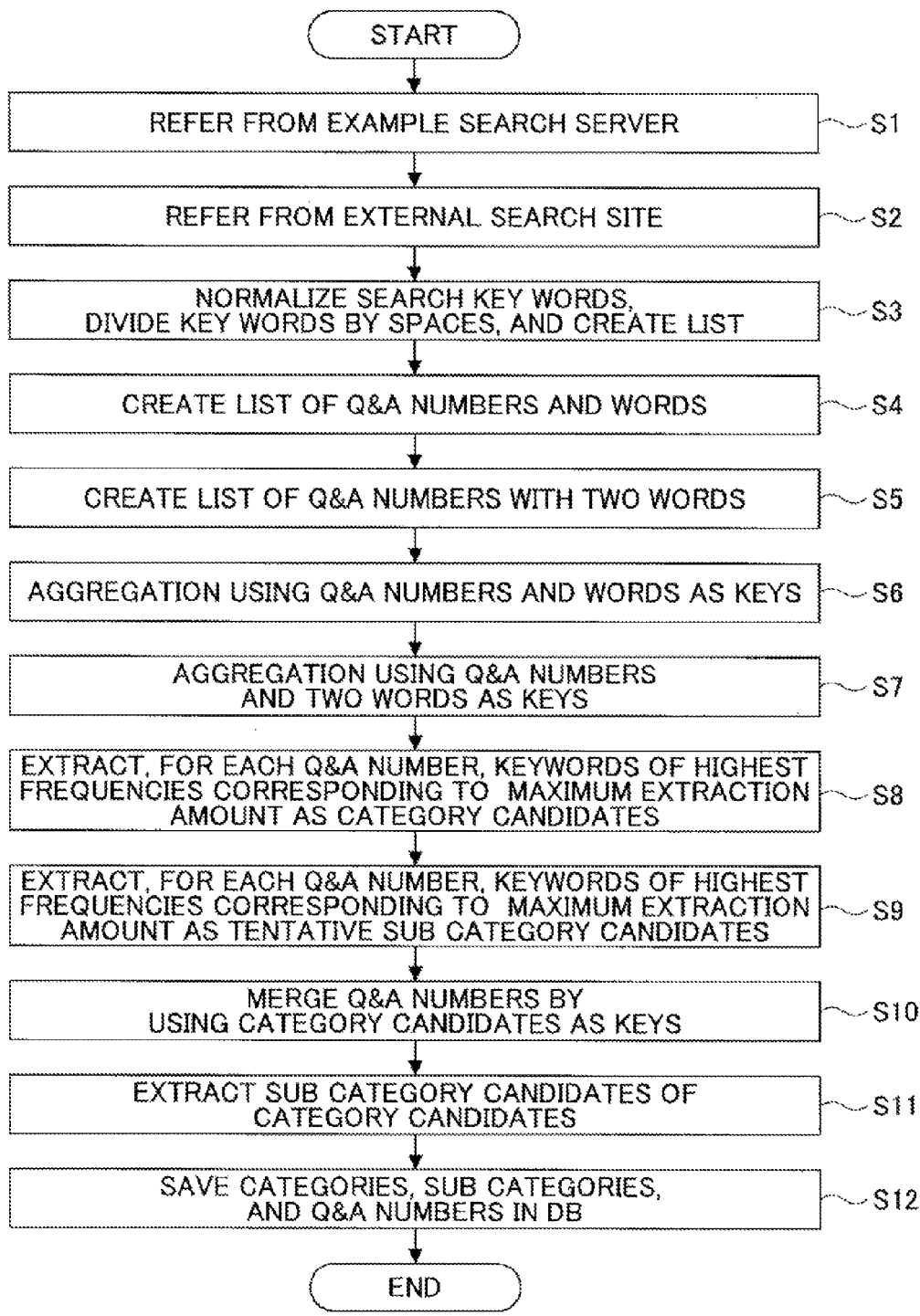
FIG. 18 is a flowchart of a category classification process.

FIG. 18 is a flowchart of a category classification process.

The aggregate unit 121 of the category extracting unit 12 extracts Q&A numbers that have been referred to by the client 4 via the example search server 1 that is the server in which the aggregate unit 121 is included (step S1). Accordingly, the extraction results 141 illustrated in FIG. 6A are generated.

The aggregate unit 121 extracts Q&A numbers referred to by the client 4 via the search server 2 that is an external search site (step S2). Accordingly, the extraction results 142 illustrated in FIG. 6B are generated. Either step S1 or step S2 may be executed first.

The aggregate unit 121 executes a normalization process and a division process according to spaces on the searched keywords (step S3). Accordingly, the normalization results 143 illustrated in FIG. 7 are generated.

The extracting unit 122 of the category extracting unit 12 creates a list of Q&A numbers and words based on the normalization results 143 (step S4). Accordingly, the word list data 144 illustrated in FIG. 8 is generated.

The extracting unit 122 creates a list of Q&A numbers with two corresponding words based on the normalization results 143 (step S5). Accordingly, the two word list data 145 illustrated in FIG. 9 is generated. Either step S4 or step S5 may be executed first.

The extracting unit 122 performs aggregation using Q&A numbers and words as keys, based on the word list data 144 (step S6). Accordingly, the aggregation results 146 illustrated in FIG. 10A are generated.

The extracting unit 122 performs aggregation using Q&A numbers and two corresponding words based on the two word list data 145 (step S7). Accordingly, the aggregation results 147 illustrated in FIG. 10B are generated. Either step S6 or step S7 may be executed first.

The extracting unit 122 extracts, for each Q&A number, keywords of highest frequencies corresponding to the maximum extraction amount as category candidates, based on the aggregation results 146 (step S8). Accordingly, the category candidate list 148 illustrated in FIG. 11A is generated.

The extracting unit 122 extracts, for each Q&A number, keywords of highest frequencies corresponding to the maximum extraction amount as tentative sub category candidates, based on the aggregation results 147 (step S9). Accordingly, the sub category candidate list 149 illustrated in FIG. 11B is generated. Either step S8 or step S9 may be executed first.

The extracting unit 122 merges the Q&A numbers by using category candidates as keys, based on the category candidate list 148 (step S10). Accordingly, the category candidate merge table 150 illustrated in FIG. 11C is generated.

The extracting unit 122 extracts sub category candidates of category candidates, based on the sub category candidate list 149 (step S11). Accordingly, the sub category candidate merge table 151 illustrated in FIG. 11D is generated.

The creating unit 123 of the category extracting unit 12 saves categories, sub categories, and Q&A numbers associated with the categories and sub categories in the Q&A database 13, based on the category candidate merge table 150 and the sub category candidate merge table 151 (step S12). That is to say, the category master 17 illustrated in FIG. 14 is generated, and the category master 17 is applied to the data configuration of the Q&A database 13.

According to an aspect of the present invention, a category classification processing device is provided, with which Q&A examples can be classified into categories based on the Q&A examples that are actually referred to by the user and input keywords.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A category classification processing device comprising:
   an example storage unit configured to store Q&A (questions and answers) examples including pairs of questions and answers;
   a log storage unit configured to store search keyword logs relevant to searching the Q&A examples; and
   a processor configured to perform a search process and a category extraction process,
   wherein the search process includes
      sending, to a terminal device, an input screen image used for inputting one or more keywords,
      searching the example storage unit using the one or more keywords input to the input screen image to extract Q&A examples based on the one or more keywords,
      sending identification information items expressing the extracted Q&A examples to the terminal device, and
      storing, in the log storage unit, search keyword logs including the identification information items relevant to the Q&A examples which are referred to at the terminal device using the identification information items, the identification information items in the search keyword logs being associated with the one or more keywords input to the input screen image during the searching, and
   wherein the category extraction process includes
      aggregating keyword storage frequencies expressing a number of times each of the keywords input to the input screen image during the searching and recorded together with the Q&A examples in the search keyword logs, is stored for each of the Q&A examples, and calculating keyword group storage frequencies expressing a number of times each of keyword groups is stored for each Q&A example, each of the keyword groups including n keywords recorded together with the Q&A examples in the search keyword log, where n is a positive integer,
      extracting, as category candidates of each of the Q&A examples, m top keywords in a descending order of the keyword storage frequencies, where m is a positive integer, and extracting, as tentative sub category candidates of each Q&A example, keywords belonging to m top keyword groups in the descending order of the keyword group storage frequency,
      using the extracted category candidates as categories, and using the extracted tentative sub category candidates as sub categories, and
      associating the categories with the sub categories, and associating the sub categories with the Q&A examples, to store the categories, the sub categories, and the Q&A examples that are associated with each other in the example storage unit.

2. The category classification processing device according to claim 1, wherein the category extraction process includes
extracting, as a first word, a keyword of the tentative sub category candidate matching the category candidate,
extracting, as one or more second words, one or more keywords of the tentative sub category candidate other than the first word, and
using each of the one or more second words as the sub categories of the category when the category candidate matching the first word is used as the category.

3. The category classification processing device according to claim 1, further comprising:
a first file storage unit configured to store a word number setting file in which a value of n is described.

4. The category classification processing device according to claim 1, wherein, when the number of keywords recorded together with each Q&A example exceeds n, the category extraction process extracts n keywords from the number of keywords exceeding n, and groups together the extracted n keywords to generate a plurality of the keyword groups.

5. The category classification processing device according to claim 1, further comprising:
a second file storing unit configured to store an extraction condition setting file in which a value of m is described.

6. The category classification processing device according to claim 1, wherein, when extracting the category candidates, the category extraction process sorts the keywords in the descending order of the storage frequency for each Q&A example, specifies ranks to which the top m keywords belong, and extracts all of or some of the keywords belonging to the specified ranks as the category candidates.

7. The category classification processing device according to claim 6, wherein
when extracting the category candidates, the category extraction process determines, for each Q&A example, whether a number of keywords belonging to the top rank is greater than or equal to m, and when m or more keywords belong to the top rank, extracts all of or some of the keywords belonging to the top rank as the category candidates, and
when less than m keywords belong to the top rank, the category extraction process determines whether a number of keywords belonging to a rank next to the top rank is greater than or equal to m, and when m or more keywords belong to the rank next to the top rank, extracts all of or some of the keywords belonging to the rank next to the top rank as the category candidates.

8. The category classification processing device according to claim 6, wherein, when extracting the category candidates, the category extraction process extracts all of the keywords recorded together with each Q&A example as the category candidates, when the number of the keywords recorded together with each Q&A example is less than m.

9. The category classification processing device according to claim 1, wherein the search process includes
searching the categories and the Q&A examples, which are associated with each other by the category extraction process, by using the one or more keywords input to the input screen image,
extracting the Q&A examples associated with the categories, and
sending the identification information expressing the extracted Q&A examples to the terminal device.

10. A category classification processing method comprising:
sending, to a terminal device, an input screen image used for inputting one or more keywords;
searching, an example storage unit that stores Q&A examples including pairs of questions and answers, by using the one or more keywords input to the input screen image to extract Q&A (questions and answers) examples based on the one or more keywords;
sending identification information items expressing the extracted Q&A examples to the terminal device;
storing, in a log storage unit that stores search keyword logs relevant to searching the Q&A examples, search keyword logs including the identification information items relevant to the Q&A examples which are referred to at the terminal device using the identification information items, the identification information items in the search keyword logs being associated with the one or more keywords input to the input screen image during the searching;
aggregating keyword storage frequencies expressing a number of times each of the keywords input to the input screen image during the searching and recorded together with the Q&A examples in the search keyword logs, is stored for each of the Q&A examples, and calculating keyword group storage frequencies expressing a number of times each of keyword groups is stored for each Q&A example, each of the keyword groups including n keywords recorded together with the Q&A examples in the search keyword log, where n is a positive integer;
extracting, as category candidates of each of the Q&A examples, m top keywords in a descending order of the keyword storage frequencies, where m is a positive integer, and extracting, as tentative sub category candidates of each Q&A example, keywords belonging to m top keyword groups in the descending order of the keyword group storage frequency;
using the extracted category candidates as categories, and using the extracted tentative sub category candidates as sub categories; and
associating the categories with the sub categories, and associating the sub categories with the Q&A examples, to store the categories, the sub categories, and the Q&A examples that are associated with each other in the example storage unit.

11. A non-transitory computer-readable recording medium having stored therein a category classification processing program for causing a computer to execute a process comprising:
sending, to a terminal device, an input screen image used for inputting one or more keywords;
searching, an example storage unit that stores Q&A examples including pairs of questions and answers, by using the one or more keywords input to the input screen image to extract Q&A (questions and answers) examples based on the one or more keywords;
sending identification information items expressing the extracted Q&A examples to the terminal device;
storing, in a log storage unit that stores search keyword logs relevant to searching the Q&A examples, search keyword logs including the identification information items relevant to the Q&A examples which are referred to at the terminal device using the identification information items, the identification information items in the search keyword logs being associated with the one or more keywords input to the input screen image during the searching;

aggregating keyword storage frequencies expressing a number of times each of the keywords input to the input screen image during the searching and recorded together with the Q&A examples in the search keyword logs, is stored for each of the Q&A examples, and calculating keyword group storage frequencies expressing a number of times each of keyword groups is stored for each Q&A example, each of the keyword groups including n keywords recorded together with the Q&A examples in the search keyword log, where n is a positive integer;

extracting, as category candidates of each of the Q&A examples, m top keywords in a descending order of the keyword storage frequencies, where m is a positive integer, and extracting, as tentative sub category candidates of each Q&A example, keywords belonging to m top keyword groups in the descending order of the keyword group storage frequency;

using the extracted category candidates as categories, and using the extracted tentative sub category candidates as sub categories; and associating the categories with the sub categories, and associating the sub categories with the Q&A examples, to store the categories, the sub categories, and the Q&A examples that are associated with each other in the example storage unit.

12. The category classification processing method according to claim 10, wherein the extracting includes extracting, as a first word, a keyword of the tentative sub category candidate matching the category candidate, and extracting, as one or more second words, one or more keywords of the tentative sub category candidate other than the first word, and wherein the using includes using each of the one or more second words as the sub categories of the category when the category candidate matching the first word is used as the category.

13. The non-transitory computer-readable recording medium as claimed in claim 11, wherein the extracting includes extracting, as a first word, a keyword of the tentative sub category candidate matching the category candidate, and extracting, as one or more second words, one or more keywords of the tentative sub category candidate other than the first word, and wherein the using includes using each of the one or more second words as the sub categories of the category when the category candidate matching the first word is used as the category.

* * * * *